(12) United States Patent
Aidasani et al.

(10) Patent No.: US 11,900,379 B2
(45) Date of Patent: *Feb. 13, 2024

(54) SYSTEM AND METHOD FOR USING A BIOMETRIC PAYMENT DEVICE

(71) Applicant: American Express Travel Related Services Company, Inc., New York, NY (US)

(72) Inventors: Dilip Lachman Aidasani, Brooklyn, NY (US); Kate T. King, Scottsdale, AZ (US); Estelle Karine Rachel Mangeney, New York, NY (US); Charles Newman, Brighton (GB); Stuart Rolinson, Cave Creek, AZ (US); Richard Grant Waters, Brighton (GB)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/191,382

(22) Filed: Mar. 28, 2023

(65) Prior Publication Data

US 2023/0237489 A1 Jul. 27, 2023

Related U.S. Application Data

(60) Continuation of application No. 17/457,994, filed on Dec. 7, 2021, now Pat. No. 11,651,370, which is a
(Continued)

(51) Int. Cl.
*G06Q 20/40* (2012.01)
*G06K 19/077* (2006.01)
(Continued)

(52) U.S. Cl.
CPC ....... *G06Q 20/40145* (2013.01); *G06F 21/32* (2013.01); *G06K 19/0718* (2013.01);
(Continued)

(58) Field of Classification Search
None
See application file for complete search history.

(56) References Cited

U.S. PATENT DOCUMENTS

D562,172 S 2/2008 Yuengling
7,715,593 B1 5/2010 Adams et al.
(Continued)

OTHER PUBLICATIONS

BlackBerry Smart Card Reader, Brochure, 2008.
(Continued)

*Primary Examiner* — Kristy A Haupt (57) ABSTRACT

Systems and methods are described related to using flexible circuitry in a payment device. In one embodiment, a payment device comprises a computing device and a memory. The computing device is configured to store a biometric identifier associated with a transaction account. The computing device is configured to at least receive, by the antenna, an interrogation signal from a point of sale (POS) device in order to activate the payment device for a payment transaction. The computing device is configured to determine a scanned fingerprint identifier of a user based at least in part on the interrogation signal activating the payment device and authenticate the scanned fingerprint identifier by matching the scanned fingerprint identifier to the biometric identifier. The transaction account is transmitted to the POS device for processing the payment transaction based at least in part on the authentication of the scanned fingerprint identifier.

20 Claims, 6 Drawing Sheets

Related U.S. Application Data continuation of application No. 16/657,818, filed on Oct. 18, 2019, now Pat. No. 11,222,336, which is a continuation of application No. 14/659,862, filed on Mar. 17, 2015, now abandoned, which is a division of application No. 13/492,002, filed on Jun. 8, 2012, now abandoned.

(51) Int. Cl.
*G06K 19/07* (2006.01)
*G06Q 20/34* (2012.01)
*G07F 7/08* (2006.01)
*G06Q 20/32* (2012.01)
*G06F 21/32* (2013.01)
*H04W 12/06* (2021.01)
*G06Q 20/20* (2012.01)

(52) U.S. Cl.
CPC . *G06K 19/07749* (2013.01); *G06K 19/07762* (2013.01); *G06Q 20/204* (2013.01); *G06Q 20/3278* (2013.01); *G06Q 20/352* (2013.01); *G07F 7/0806* (2013.01); *H04W 12/06* (2013.01); *H04W 12/068* (2021.01)

(56) References Cited

U.S. PATENT DOCUMENTS

| | | |
|---|---|---|
| 7,889,052 B2 | 2/2011 | Berardi et al. |
| 8,127,982 B1 | 3/2012 | Casey et al. |
| 8,284,025 B2 | 10/2012 | Beenau et al. |
| 8,694,793 B2 | 4/2014 | Evans |
| 9,390,411 B2 | 7/2016 | Jarman et al. |
| 11,222,336 B1* | 1/2022 | Aidasani ............... H04W 12/06 |
| 11,651,370 B1* | 5/2023 | Aidasani ............... G06Q 20/306 |
| | | 705/64 |
| 2003/0167207 A1 | 9/2003 | Berardi et al. |
| 2005/0071671 A1 | 3/2005 | Karaoguz |
| 2005/0096513 A1 | 5/2005 | Ozguz et al. |
| 2005/0210270 A1 | 9/2005 | Rohatgi et al. |
| 2006/0219776 A1 | 10/2006 | Finn |
| 2008/0033722 A1 | 2/2008 | Beenau et al. |
| 2009/0096614 A1 | 4/2009 | Singleton et al. |
| 2009/0307142 A1* | 12/2009 | Mardikar ........... G06Q 20/3821 |
| | | 705/72 |
| 2010/0223197 A1 | 9/2010 | Ames |
| 2013/0026229 A1 | 1/2013 | Jarman et al. |
| 2013/0134227 A1 | 5/2013 | De Maquille et al. |
| 2013/0185453 A1 | 7/2013 | Louie |

OTHER PUBLICATIONS

Smart Card Alliance, publication No. PT3002, Contactless Payment and the Retail Point of Sale: Applications, Technologies and Transaction Models, Mar. 2002.

* cited by examiner

FIG 6

SYSTEM AND METHOD FOR USING A BIOMETRIC PAYMENT DEVICE

CROSS-REFERENCE TO RELATED APPLICATIONS

This application is a continuation application that claims priority to co-pending U.S. Ser. No. 17/457,664, filed on Dec. 7, 2021, and entitled "SYSTEM AND METHOD FOR USING FLEXIBLE CIRCUITRY IN PAYMENT ACCESSORIES, which is a continuation application that claims priority to co-pending U.S. Ser. No. 16/657,818, filed on Oct. 18, 2019, and entitled "SYSTEM AND METHOD FOR USING FLEXIBLE CIRCUITRY IN PAYMENT ACCESSORIES," which is a continuation application that claims priority to, and the benefit of, U.S. Ser. No. 14/659,862, filed on Mar. 17, 2015 and entitled "SYSTEM AND METHOD FOR USING FLEXIBLE CIRCUITRY IN PAYMENT ACCESSORIES," which is a divisional application that claims priority to, and the benefit of, U.S. Ser. No. 13/492,002 filed Jun. 8, 2012 and entitled "SYSTEM AND METHOD FOR USING FLEXIBLE CIRCUITRY IN PAYMENT ACCESSORIES," which are incorporated herein by reference in their entireties.

FIELD OF DISCLOSURE

The present disclosure generally relates to payment devices, and more specifically, to wearable RFID enabled payment devices.

BACKGROUND OF THE DISCLOSURE

The proliferation of transaction accounts, which allow the cardholder to pay with credit rather than cash, started in the United States in the early 1950s. Initial transaction cards were typically restricted to select restaurants and hotels and were often limited to an exclusive class of individuals. Since the introduction of plastic credit cards, the use of transaction cards have rapidly proliferated from the United States, to Europe, and then to the rest of the world. Transaction cards are not only information carriers, but also typically allow a consumer to pay for goods and services without the need to constantly possess cash, or if a consumer needs cash, transaction cards allow access to funds through an automatic teller machine (ATM). Transaction cards also reduce the exposure to the risk of cash loss through theft and reduce the need for currency exchanges when traveling to various foreign countries. Due to the advantages of transaction cards, hundreds of millions of cards are now produced and issued annually, thereby resulting in need for companies to differentiate their cards from competitor's cards.

Initially, the transaction cards often included the issuer's name, the cardholder's name, the card number, and the expiration date embossed onto the card. The cards also usually included a signature field on the back of the card for the cardholder to provide a signature to protect against forgery and tempering. Thus, the initial cards merely served as devices to provide data to merchants and the only security associated with the card was the comparison of the cardholder's signature on the card to the cardholder's signature on a receipt along with the embossed cardholder name on the card. However, many merchants often forget to verify the signature on the receipt with the signature on the card.

Due to the popularity of transaction cards, numerous companies, banks, airlines, trade groups, sporting teams, clubs and other organizations have developed their own transaction cards. As such, many companies continually attempt to differentiate their transaction cards and increase market share, not only by offering more attractive financing rates and low initiation fees, but also by offering unique, aesthetically pleasing features on the transaction cards.

Administrative and security issues (e.g., charges, credits, merchant settlement, fraud, reimbursements, etc.) have increased due to the increasing use of transaction cards. Thus, the transaction card industry started to develop more sophisticated transaction cards which allowed the electronic reading, transmission, and authorization of transaction card data for a variety of industries. For example, magnetic stripe cards, optical cards, smart cards, calling cards, and supersmart cards have been developed to meet the market demand for expanded features, functionality, and security. In addition to the visual data, the incorporation of a magnetic stripe on the back of a transaction card allows digitized data to be stored in machine readable form. As such, magnetic stripe readers are used in conjunction with magnetic stripe cards to communicate purchase data received from a cash register device on-line to a host computer along with the transmission of data stored in the magnetic stripe, such as account information and expiration date.

Due to the susceptibility of the magnetic stripe to tampering, the lack of confidentiality of the information within the magnetic stripe and the problems associated with the transmission of data to a host computer, integrated circuits were developed which could be incorporated into transaction cards. These integrated circuit (IC) cards, known as smart cards, proved to be very reliable in a variety of industries due to their advanced security and flexibility for future applications.

The incorporation of machine-readable components onto transactions cards encouraged the proliferation of devices to simplify transactions by automatically reading from and/or writing onto transaction cards. Such devices include, for example, bar code scanners, magnetic stripe readers, point of sale terminals (POS), automated teller machines (ATM) and card-key devices.

Like barcode and voice data entry, radio-frequency identification (RFID) is a contactless information acquisition technology. RFID systems are wireless, and are usually extremely effective in hostile environments where conventional acquisition methods fail. RFID has established itself in a wide range of markets, such as, for example, the high-speed reading of railway containers, tracking moving objects such as livestock or automobiles, and retail inventory applications.

These transaction cards, while useful for completing financial transactions and highly portable, are often undesirable due to the requirement for a carrier, generally a wallet or purse. Also, these transaction cards are traditionally issued to a single user which limits the functionality of permitting authorized agents to make transactions on behalf of the account holder or with the approval of a reimbursement provider.

Therefore, a need exists for a system and method for to address the above recited needs and for increasing portability and distribution of control of a transaction instrument.

SUMMARY OF THE DISCLOSURE

These above disclosed needs are successfully met via the disclosed system and method. In various embodiments, a wearable radio-frequency identification transaction device comprising a radio-frequency identification fob, a microprocessor; and a biometric sensor is disclosed. The wearable radio-frequency identification transaction device may be configured to interact with a RFID reader. The biometric sensor may be a fingerprint reader. The radio-frequency identification fob may be configured to interact with an RFID reader coupled to a point of sale system. The radio-frequency identification transaction device may be configured to be inserted and removed from an object intended to be worn by a user.

In various embodiments, the radio-frequency identification transaction device may be configured to be housed within at least one of a bracelet, ring, wrist band, key ring fob, retractable id, necklace, jewelry charm, lanyard, watch, band, and/or pin. The user may configure the radio-frequency identification transaction device. For instance, the user may configure the radio-frequency identification transaction device to be available for use for a limited duration, a reoccurring period, limited geographic use, for limited transaction types, a capped transaction amount, use at specified merchants, and capped to a specified balance. The radio-frequency identification transaction device may include a flexible display. Inputted fingerprint data may be used to identify a transaction account of a plurality of transaction accounts. Wireless transmission capabilities of the radio-frequency identification transaction device may be activated in response to inputted biometric data matching previously stored biometric data.

In various embodiments, the radio-frequency identification transaction device is configured to interact with social media applications. The RFID device may be configured to geotag the radio-frequency identification transaction device and use thereof. The radio-frequency identification transaction device is configured to be used in credit transactions, charge account transactions, loyalty point transactions, prepaid transactions and debit transactions. The radio-frequency identification transaction device is configured to grant physical access to a restricted location based upon at least one of visual inspection and wireless communication technology. For instance, the color of the device may grant special privileges or be an indicator. Also, data communicated wirelessly may grant privileges.

In various embodiments, the radio-frequency identification transaction device is configured to grant access to transportation and/or secure locations. The radio-frequency identification transaction device may include lighted indicators to provide user feedback. The radio-frequency identification transaction device may be a passive device. The radio-frequency identification transaction device may be coupled to a battery. The radio-frequency identification fob may be configured to interact with an RFID reader to transfer personal information.

In various embodiments, a system includes a processor configured to provide information via a wearable radio-frequency identification transaction device, a tangible, non-transitory memory configured to communicate with the processor, the tangible, non-transitory memory having instructions stored thereon that, in response to execution by the processor, cause the processor to perform operations comprising: storing, by the processor, encrypted biometric data associated with a user transaction account to a storage memory of a wearable radio-frequency identification transaction device. The system may include inputting biometric data, via a biometric housed on the wearable radio-frequency identification transaction device. Additionally, the system may include encrypting the inputted biometric data. The system may include comparing the inputted encrypted biometric data to the stored encrypted biometric data. Furthermore, the system may include accessing the stored user transaction account data of a plurality of stored user transaction account data, in response to the inputted encrypted biometric data matching the stored encrypted biometric data associated with the user transaction account. The system may include enabling the wireless transmitting capabilities of the wearable radio-frequency identification transaction device, in response to the inputted encrypted biometric data matching the stored encrypted biometric data. Additionally, the system may include transmitting user transaction account information In various embodiments, a computer-implemented method may comprise storing encrypted biometric data associated with a user transaction account to a wearable radio-frequency identification transaction device. Also, this computer-implemented method may comprise inputting biometric data, via a biometric sensor housed on a wearable radio-frequency identification transaction device. This computer-implemented method may comprise encrypting the inputted biometric data. Additionally, this computer-implemented method may comprise comparing the inputted encrypted biometric data to the stored encrypted biometric data. In various embodiments, this computer-implemented method may comprise accessing the stored user transaction account data of a plurality of stored user transaction account data in response to the inputted encrypted biometric data matching the stored encrypted biometric data associated with the user transaction account. Also, this computer-implemented method may comprise enabling the wireless transmitting capabilities of the wearable radio-frequency identification transaction device in response to the inputted encrypted biometric data matching the stored encrypted biometric data. This computer-implemented method may comprise transmitting user transaction account information.

BRIEF DESCRIPTION OF THE DRAWINGS

The accompanying drawings, wherein like numerals depict like elements, illustrate exemplary embodiments of the invention, and together with the description, serve to explain the principles of the invention. In the drawings.

DETAILED DESCRIPTION

The detailed description of various embodiments herein makes reference to the accompanying drawings and pictures, which show exemplary embodiments by way of illustration. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

In various embodiments, the methods and systems described herein are implemented using RFID and near field communication technology; however, those skilled in the art will appreciate that in various embodiments in place of RFID communication other wireless communication techniques and hardware/software is envisioned. For instance, in various embodiments the systems described herein may comprise a transmitter, transponder and/or receiver. These transmitter, transponder and/or receiver may communicate over any wireless communication mode, such as radio frequency communication, microwave communication or infrared (IR) short-range communication, and/or the like. In various embodiments the systems described herein may communicate over a network and/or using GPS, Bluetooth, satellite, wireless USB, and/or the like using existing or future techniques.

Figure 1:
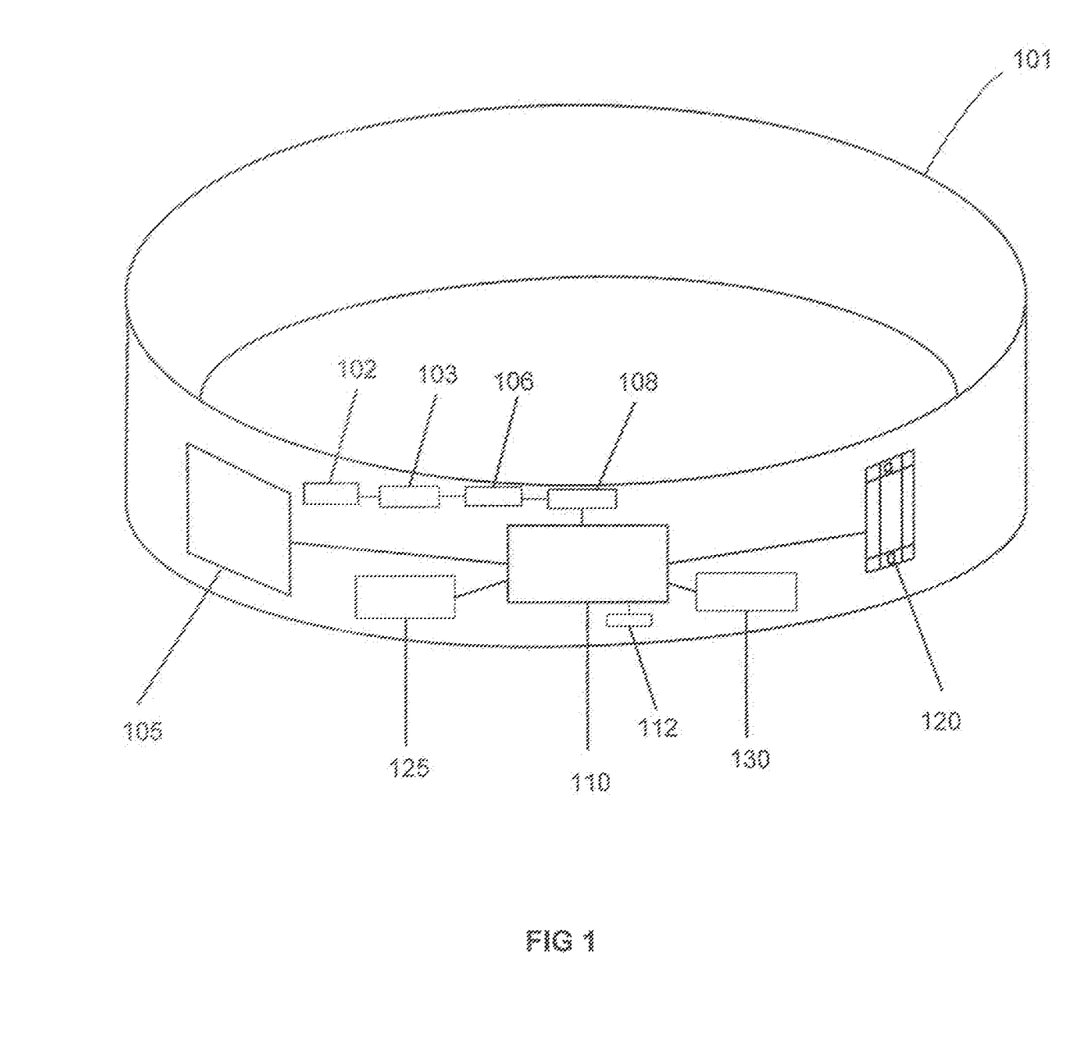
FIG. 1 illustrates an exemplary RF transaction device in accordance with various embodiments of the present disclosure.

In various embodiments, and with reference to FIG. 1, the present system 100 may comprise RFID data acquisition technology which may be embedded in a fob 105 or tag for use in completing financial transactions and transfer data. This fob 105 may be a self-contained device which includes a transponder. Fob 105 may be contained on any portable form factor. In various embodiments, system 100 and/or the fob 105 may comprise flexible circuitry. For instance, the fob 105 may be housed in a wearable transaction instrument, such as a bracelet, ring, wrist band, retractable id, necklace, jewelry charm, lanyard, watch, band, pin, and/or the like. The fob 105 is configured to be used in wireless communication with an RFID reader device. System 100 may further comprise a microprocessor 110. This microprocessor may be integral to fob 105 or coupled to fob 105.

In various embodiments, though it may be made from any suitable material, the wearable RF transaction device 101 housing/bracelet is made from silicone. It may be substantially water resistant and/or waterproof. In various embodiments, RF transaction device 101 is fashioned to be inserted in, or integral to, jewelry, such as a Troll, Pandora, Biagi sized charm/bead. This charm may be made from precious and semiprecious jewels and/or rare metals.

In various embodiments, a battery may be included with and/or coupled to fob 105 to power the transponder. In which case, the internal circuitry of fob 105 (including the transponder) may draw its operating power from the battery power source. Alternatively, fob 105 may exist independent of an internal power source. In this instance, the internal circuitry of fob 105 (including the transponder) may gain its operating power directly from an RF interrogation signal and/or a combination of battery and RF interrogation signal power. In conventional fob powering technologies used, fob 105 is typically activated upon presenting fob 105 to/in the field of an interrogation signal. In this regard, fob 105 may be activated irrespective of whether the user desires such activation. Historically, inadvertent presentation of the fob resulted in initiation and completion of an unwanted transaction. The present system allows fob 105 user to control activation of fob 105 to limit transactions being undesirably completed. Secondary information such as authorization data and/or a PIN (personal identification number) may be used with RF transaction device 101 for identification and authentication.

In various embodiments, consumer payment information is transmitted using RF technology, where information can be accessed without physical procession of the payment device (e.g., card or fob). The data transmitted may be secured by encryption. For a basic introduction to cryptography, please review a text written by Bruce Schneider which is entitled "Applied Cryptography: Protocols, Algorithms, and Source Code In C," published by John Wiley & Sons (second edition, 1996), which is hereby incorporated by reference.

In the scenario where RF transaction device 101 comprises multiple transaction accounts, instead of relying on a counter and an algorithm to determine which should be used or other selection protocol, a PIN and/or authorization data provided by the accountholder may be used. The terms account holder or cardmember shall mean any person, entity, government organization, business, machine associated with a transaction account, regardless of whether a physical card is associated with the account. For example, the cardmember may include a transaction account owner, an transaction account user, an account affiliate, a child account user, a subsidiary account user, a beneficiary of an account, a custodian of an account, or any other person or entity affiliated or associated with a transaction account.

When RF transaction device 101 is presented to a RF reader, the accountholder may be prompted to enter a PIN and/or authorization data (e.g., biometric data). The PIN and/or authorization data may authenticate the user to use the account. In the scenario of multiple accounts, the entered PIN and/or authorization data may be used to identify which account should be used to process the transaction request. This allows RF transaction device 101 to store different account codes for different types of accounts, such as, for example, credit, charge, debit, pre-paid, and loyalty accounts. As an example, data related to two accounts may exist on the RF device representing a charge and credit account, each associated with a unique PIN and/or unique authorization data. When the RF device is presented, the accountholder may decide which account should be used for the payment through the PIN entered and/or authorization data provided. The entered PIN would be returned to RF transaction device 101 and used to identify which device and/or account will be used. If the PIN for the charge account is used, that account is used in the transaction request that is provided to the RF reader. This approach includes a RF transaction device 101 with greater processing capabilities and extends the security of the account codes stored in RF transaction device 101 by requesting an explicit authentication of the account by the accountholder before the payment is consummated.

In various embodiments, system 100 may comprise use biometric data as authentication data. The biometric data may comprise, a user's voice, fingerprint, facial, ear, signature, vascular patterns, DNA sampling, hand geometry, sound, olfactory, keystroke/typing, iris, retinal data and/or any other biometric relating to recognition based upon any body part, function, system, attribute and/or other characteristic, or any portion thereof.

With renewed reference to FIG. 1, system 100 may comprise a biometric reader 120, such as a finger print scanner, microphone/voice recognition capture device, camera, and/or a retinal scanner. Biometric reader 120 may be coupled to and/or integral to the fob. Moreover, biometric reader 120 may be coupled to and/or integral to RF transaction device 101.

In various embodiments, a method for facilitating access to at least one data set that is stored on RF transaction device 101 is practiced. The data set may correspond to a transaction account. The RF transaction device 101 in accordance with this disclosure may be used to pay for acquisitions, obtain access or transportation, provide identification, pay an amount, receive payment, redeem reward points and/or the like. See, for example, Sony's "Near Field Communication" ("NFC") standard which is touted as operating on 13.56 MHz and allowing the transfer of any kind of data between NFC enabled devices and across a distance of up to twenty centimeters. See also, Bluetooth chaotic network configurations; which is incorporated herein by reference. Furthermore, data on a first RF transaction device 101 may be transmitted directly or indirectly to another RF device to create a copy of all or part of the original device. For more information on radio frequency enabled transaction devices, see U.S. patent application Ser. No. 10/340,352, entitled "SYSTEM AND METHOD FOR INCENTING PAYMENT USING RADIO FREQUENCY IDENTIFICATION IN CONTACT AND CONTACTLESS TRANSACTIONS," filed Jan. 10, 2003, incorporated herein by reference.

As used herein, the terms "account information" or "data set" may include any set of information and/or the like which may be used, for example, in completing a transaction. For example, data sets may include information related to credit transaction accounts, debit transaction accounts, membership club accounts, loyalty program accounts, speed pass accounts, rental car memberships, frequent flyer programs, to coupons, tickets and/or the like. This information may include membership identifiers, account code(s), personal information, balances, past transaction details, account issuer routing code(s), cookies, identifiers, security codes, and/or any other information. The data set may additionally include an issuer defined management process for determining which subsets of data are to be provided to an issuer or merchant. In some instances, a data set may be associated with one or more account codes corresponding to accounts maintained by the account issuer. The various data sets associated with RF transaction device 101 may either be stored on RF device 101 or they may be stored remotely and accessed via a stored indicator linked with matching biometric data.

RF transaction device 101 may be configured to communicate via a radio frequency transponder to a merchant system or account system (by a RFID reader). In yet another embodiment, transaction device 101 may be configured to comprise one or more antennae that are configured to send and receive information and the transaction device may be responsive to different RF frequencies. In one exemplary embodiment, each antenna may be configured to send and/or receive and/or communicate using a particular protocol and/or frequency. Thus, RF transaction device 101 may be configured to communicate with two or more reader devices that each communicate with the transaction device using different transmission frequencies.

RF transaction device 101 may include an antenna 102 for receiving an interrogation signal from an RFID reader via an antenna 102. RF transaction device 101 antenna 102 may be in communication with a transponder 103. In one exemplary embodiment, the transponder may be a 13.56 MHz transponder compliant with the ISO/IEC 14443 standard, and antenna 102 may be of the 13 MHz variety. The transponder may be in communication with a transponder compatible modulator/demodulator 106 configured to receive the signal from the transponder and configured to modulate the signal into a format readable by any later connected circuitry. Further, modulator/demodulator 106 may be configured to format (e.g., demodulate) a signal received from the later connected circuitry in a format compatible with the transponder for transmitting to an RFID reader via antenna 102. For example, where transponder is of the 13.56 MHz variety, modulator/demodulator 106 may be ISO/IEC 14443-2 compliant. In various embodiments, global positioning system software and hardware to effect GPS and/or geotagging functionality may be included in the device.

Modulator/demodulator 106 may be coupled to a protocol/sequence controller 108 for facilitating control of the authentication of the signal provided by the RFID reader, and for facilitating control of the sending of a transaction device account code. In this regard, protocol/sequence controller 108 may be any suitable digital or logic driven circuitry capable of facilitating determination of the sequence of operation for the transaction device innercircuitry. For example, protocol/sequence controller 108 may be configured to determine whether the signal provided by the RFID reader is authenticated, and thereby providing to the RFID reader the account code stored on RF transaction device 101.

Protocol/sequence controller 108 may be further in communication with authentication circuitry 110 for facilitating authentication of the signal provided by the RFID reader. Authentication circuitry 110 may be further in communication with a non-volatile secure memory database 112. Secure memory database 112 may be any suitable elementary file system such as that defined by ISO/IEC 7816-4 or any other elementary file system allowing a lookup of data to be interpreted by the application on the fob.

The present system 100 may comprise flexible electronics to facilitate users "wearing" the transaction device 101. Flexible electronics, and/or flexible circuits, also known as flex circuits, is a technology for assembling electronic circuits by mounting electronic devices on flexible plastic substrates, such as polyimide, PEEK or transparent conductive polyester film. Additionally, flex circuits can be screen printed silver circuits on polyester. Flexible electronic assemblies may be manufactured using identical components used for rigid printed circuit boards, allowing the board to conform to a desired shape, or to flex during its use. These flexible printed circuits (FPC) are made with a photolithographic technology. An alternative way of making flexible foil circuits and/or flexible flat cables (FFCs) is laminating very thin copper strips in between two layers of PET. These PET layers, typically approximately 0.05 mm thick, are coated with an adhesive which is thermosetting, and will be activated during the lamination process. The substrate may comprise thin flexible plastic or metal foil. Thus, the entire system may be flexible, as the film deposited on top of the substrate is usually very thin, on the order of a few micrometres. In the case of an embedded display, organic light-emitting diodes (OLEDs) may be used instead of a back-light for flexible displays, making a flexible organic light-emitting diode display.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The system 100 may also comprise feedback. For example, the optional feedback may be in the form of an LED, an LED screen and/or other visual display which is configured to light up or display a static, scrolling, flashing and/or other message and/or signal to inform RF transaction device's 101 user or any other third party that the transaction is initiated (e.g., RF transaction device 101 is being interrogated), RF transaction device 101 is valid (e.g., RF transaction device 101 is authenticated), transaction is being processed, (e.g., RF transaction device 101 account code is being read by RFID reader), the transaction is accepted or denied (e.g., transaction approved or disapproved, that RF transaction device 101 is receiving power, RF transaction device 101 is reading biometric data, RF transaction device 101 is ready to read biometric data, RF transaction device 101 has read biometric data, and/or RF transaction device 101 is transmitting information. Various colors for different activities and/or patterns of indicators, such as visual indicators and/or blinking lights may be practiced. Such optional feedback may or may not be accompanied by an audible indicator for informing RF transaction device 101 user of the transaction status. The audible feedback may be a simple tone, multiple tones, musical indicator, and/or voice indicator configured to signify when RF transaction device 101 is being interrogated, the transaction status, or the like. Thus, RF transaction device 101 may comprise a speaker.

Authentication circuitry in the RFID reader may be configured to authenticate the signal provided by RF transaction device 101 in a similar manner that authentication circuitry may be configured to authenticate the signal provided by the RFID reader. In one exemplary embodiment, RF transaction device 101 and the RFID reader engage in mutual authentication. In this context, "mutual authentication" may mean that operation of the system 100 may not take place until RF transaction device 101 authenticates the signal from the RFID reader, and the RFID reader authenticates the signal from RF transaction device 101. For a detailed explanation of a suitable transaction processing method and mutual authentication process for use with the invention, see, for example, U.S. patent application Ser. No. 10/192,488, titled "SYSTEM AND METHOD FOR PAYMENT USING RADIO FREQUENCY IDENTIFICATION IN CONTACT AND CONTACTLESS TRANSACTIONS," filed Jul. 9, 2002, and U.S. patent application Ser. No. 10/340,352, titled "SYSTEM AND METHOD FOR INCENTING PAYMENT USING RADIO FREQUENCY IDENTIFICATION IN CONTACT AND CONTACTLESS TRANSACTIONS," filed Jan. 10, 2003, both incorporated herein by reference.

Figure 2:
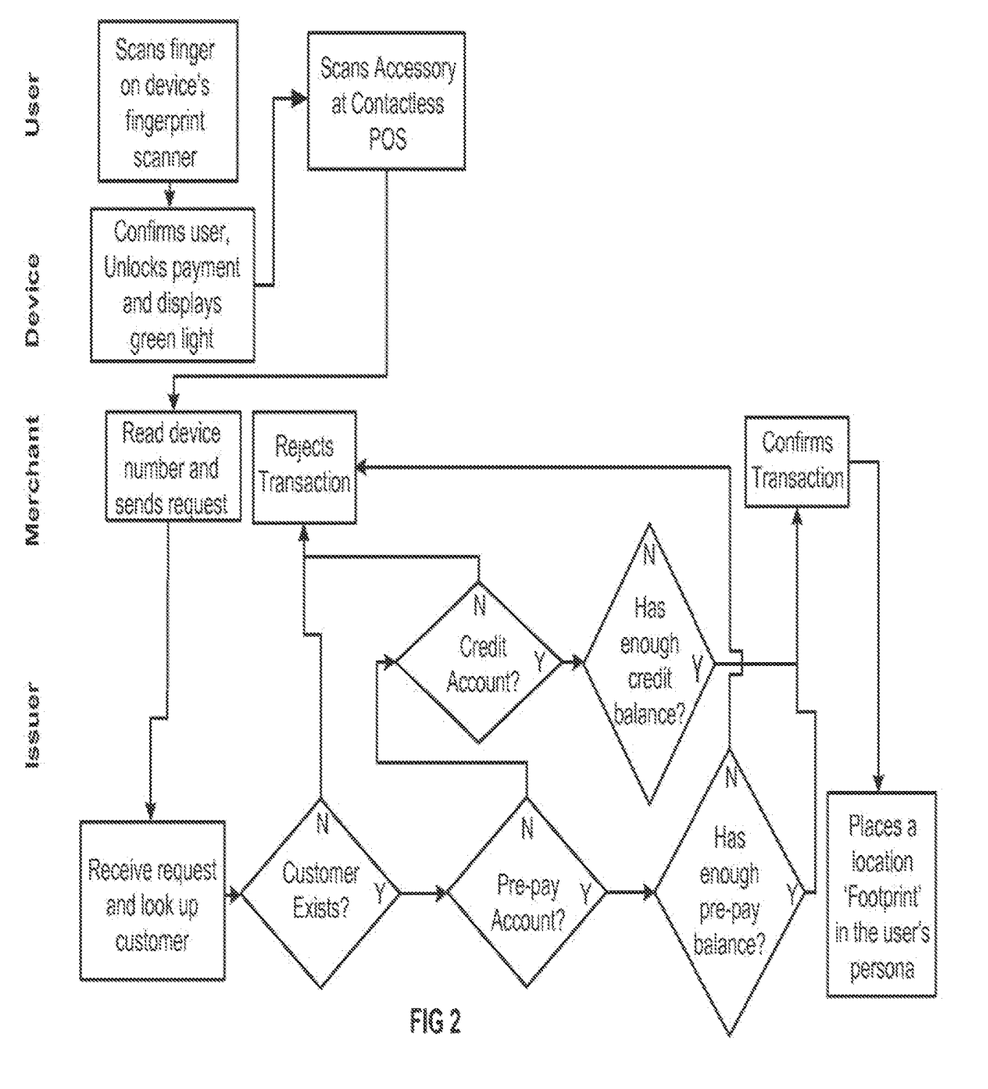
FIG. 2 illustrates a flowchart in accordance with various embodiments of the present disclosure.

With reference to FIG. 2, en exemplary flow chart depicts the process of using RF transaction device 101 is presented. For instance, a user may present RF transaction device 101 to an RF interrogation signal. This RF interrogation signal may provide power to RF transaction device 101. The interrogation signal may be verified for security purposes. In response to the interrogation signal being verified, the user is ready to transmit data set information. In various embodiments, a user may present their finger to a fingerprint reader 120 located on RF transaction device 101. The fingerprint reader 120 scans the fingerprint of the user. A comparison of the scanned finger print is made against a previously stored trusted fingerprint scan. In various embodiments, various data sets may be linked to different previously stored fingerprint data. For example, a first transaction account may be linked to a first user's right index finger, while a second transaction account may be linked to a first user's right thumb. In another example, a first transaction account may be linked to a first user's right index finger, while a second transaction account may be linked to a second user's right index finger. Thus, a single device may be shared by multiple users, or two identical devices may be allocated to two shared transaction accounts or accounts having more than one authorized user.

In response to a match, RF transaction device 101 is "unlocked" and ready for transmitting information. In some embodiments, an indicator is presented to the user that RF transaction device 101 is ready for transmitting information to a RFID transaction reader/contactless reader. For instance, a light may be illuminated on RF transaction device 101. The user may then present RF transaction device 101 to the RFID reader/contactless reader. This RFID reader/contactless reader will generally be working in concert with or be coupled to a point of sale system (POS). The POS is configured for transmitting information related to the transaction.

In response to the user presenting unlocked RF transaction device 101, the RFID reader/contactless reader may read data set information transmitted from RF transaction device 101. The RFID reader/contactless reader may then transmit a transaction request to a payment processor.

It should be noted, that one or more RF transaction device 101 may be issued with or without one or more data sets stored thereon. RF transaction device 101 may be issued using various techniques and practices now known or hereinafter developed wherein an instrument is prepared (e.g., loaded with data) and made available to a user for effecting transactions. Although the invention may contemplate managing data sets before issuing RF transaction device 101, in various embodiments, by way of illustration, the data sets are described herein as being managed after issuance.

The payment processor may use preprogrammed logic to authorize the transaction. This pre-programmed logic may include identification of the customer, identification of account type (e.g. credit, debit, loyalty, pre-paid, charge, etc.) a verification that the account is in good standing (e.g. does not exceed credit limit, the account is not in arrears, there is enough balance in the prepaid account to cover the transaction, etc.)

If one or more of these criteria are not met the transaction may be declined. If one or more of these criteria are met, the transaction may be confirmed and the payment processor may send an approval message to the POS system. The transaction may then be consummated. In various embodiments, the GPS location of the POS system and/or the GPS location of RF transaction device 101 may be stored to a storage memory by the payment processor/transaction account issuer or RF transaction device 101.

In some instances, the account issuer that provides the transaction account code to the user may request the user to provide a PIN or other secondary identifier prior to permitting use of the transaction account code for transaction completion. In this case, a POS device may be configured to prompt user to provide the appropriate PIN for verification by RFID payment processor, merchant system, or issuer system. The user may provide the PIN and the PIN may be verified under merchant system or issuer system defined verification protocol. If the PIN is not verified, then the merchant system may terminate the transaction request.

Figure 3:
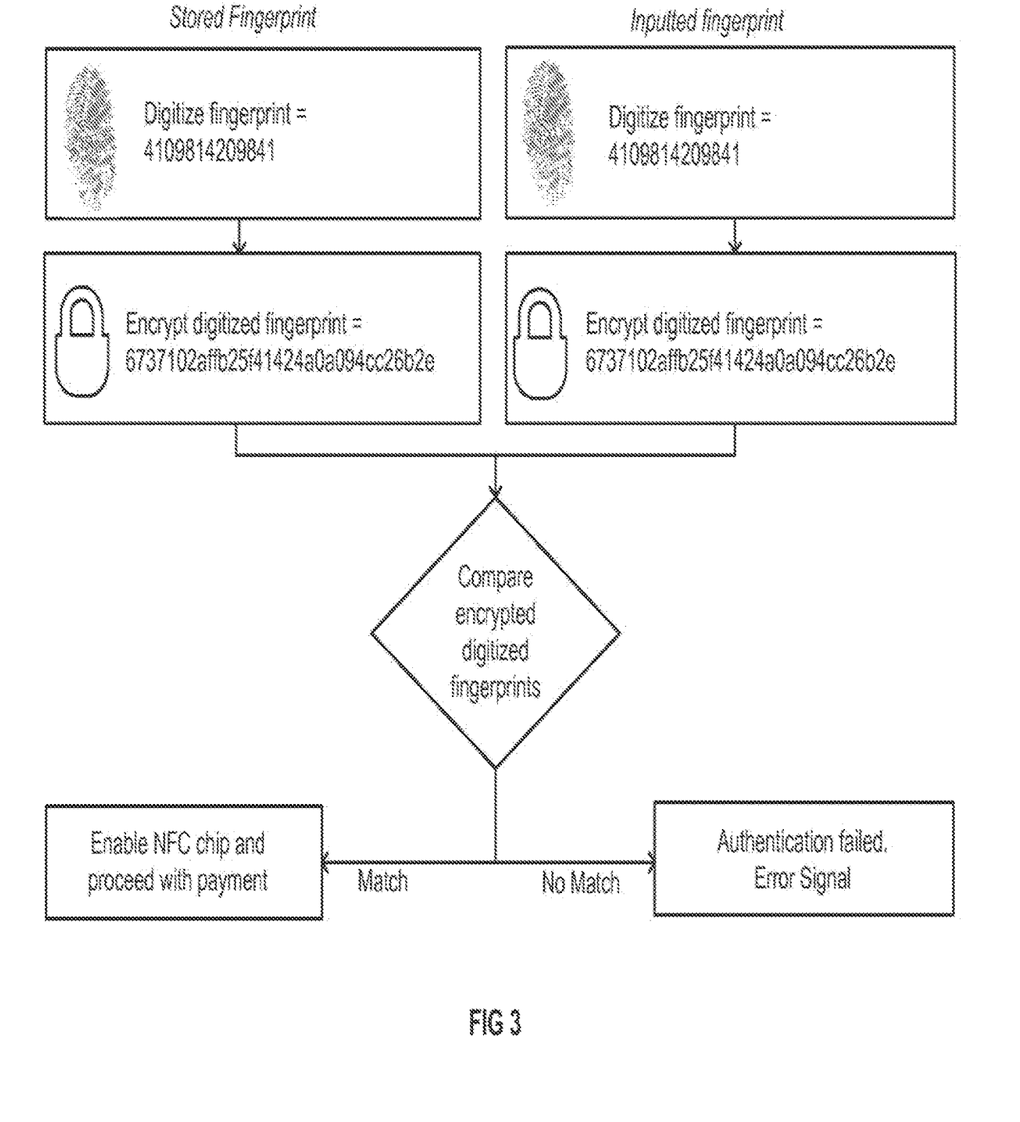
FIG. 3 illustrates a flowchart of an exemplary authentication process in accordance with various embodiments of the present disclosure.

With reference to FIG. 3, an exemplary biometric identification verification process is depicted. Contrary to other systems, in various embodiments, this (encrypted) biometric data is verified locally at RF transaction device 101 and the transfer of transaction information is not initiated until a match of pre-stored biometric data is made. As shown in FIG. 3, digitized fingerprint data may be inputted to a fingerprint compare module. This inputted digitized fingerprint data may be encrypted (after being input). Either the digitized fingerprint data or encrypted digitized fingerprint data may be compared with pre-stored (trusted) respective digitized fingerprint data or encrypted digitized fingerprint data. If a match is made, the near field communication and/or RFID technology is activated and data may be sent for a predetermined period of time. If no match is made an error signal may be communicated. In response to the error signal, a user may be requested to/elect try again. Though not depicted, the device may match the inputted digitized fingerprint to a selection of pre-stored fingerprints and associate the inputted digitized fingerprint to a particular user and a particular user's transaction account. In this way, the digitized fingerprint data may act as an account selection identifier.

Figure 4:
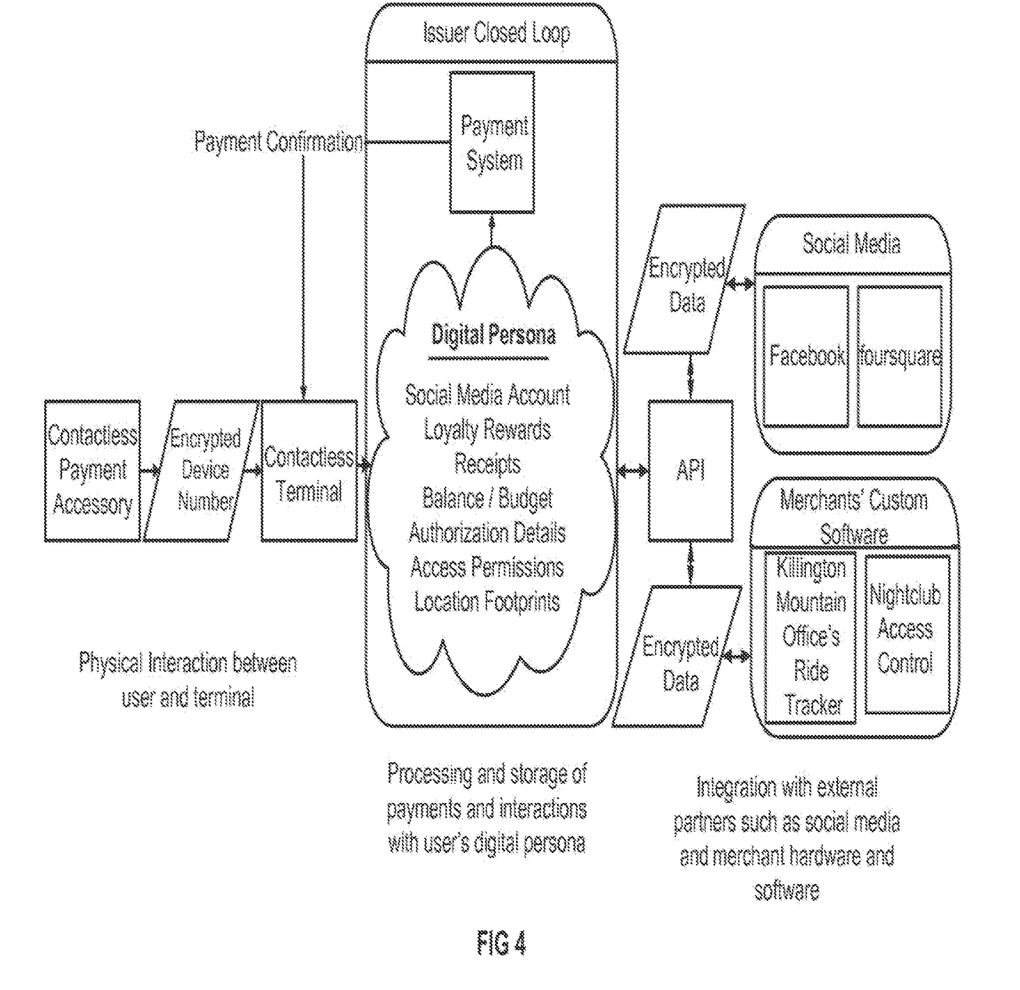
FIG. 4 illustrates an exemplary technical architecture in accordance with various embodiments of the present disclosure.

With reference to FIG. 4, the physical interaction between RF transaction device 101 and a RFID reader/POS system is depicted. This RFID reader/POS system is electronically coupled to an issuer system/payment processor system. Additionally, the issuer system/payment processor system's interaction with external partners is depicted in FIG. 3. For instance, the issuer system may compile historical use of RF transaction device 101. This historical use may be used to develop trends and user preferences. This historical use compared with other users historical use to develop recommendations. These recommendations may be presented to the user via a transaction issuer portal, direct mail offers, email offers, and/or social media messages. Additionally, this data and/or portions of this data may be shared with third party applications. In general, a user would authorize the dissemination of this RF transaction device 101 data prior to distribution.

For instance, a user may consummate a transaction for a beverage at a concert using RF transaction device 101. The issuer system may record this historical data to an established digital persona for the transaction account. This data may be pushed to a social media application, such as Foursquare™. Foursquare™ may automatically record and/or broadcast the user's location via the location of the POS device or the location of RF transaction device 101. This data may be pushed to a social media application, such as twitter, facebook, google +, linkedin, and freindster.

In various embodiments, the user's Facebook "friends" that have also consummated a transaction at the concert may be identified from the user's Facebook account and a message may be automatically pushed to a device, such as mobile device of the user indicating that a "friend" is in attendance. Additionally, RF transaction device 101 may be used to access and gain entry to a VIP area at the concert using its NFC/RFID functionality saving time and increasing security for the user and the venue.

Figure 5:
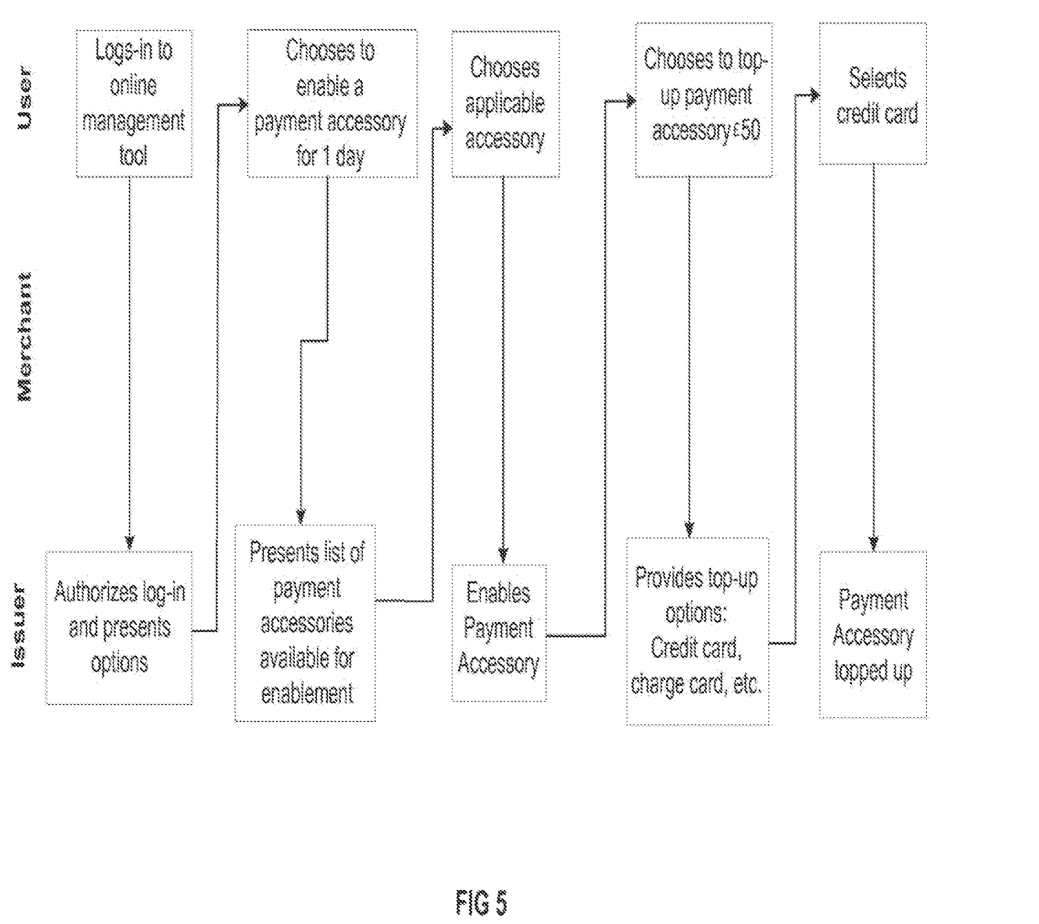
FIG. 5 illustrates a flowchart of user interaction in accordance with various embodiments of the present disclosure.
Figure 6:
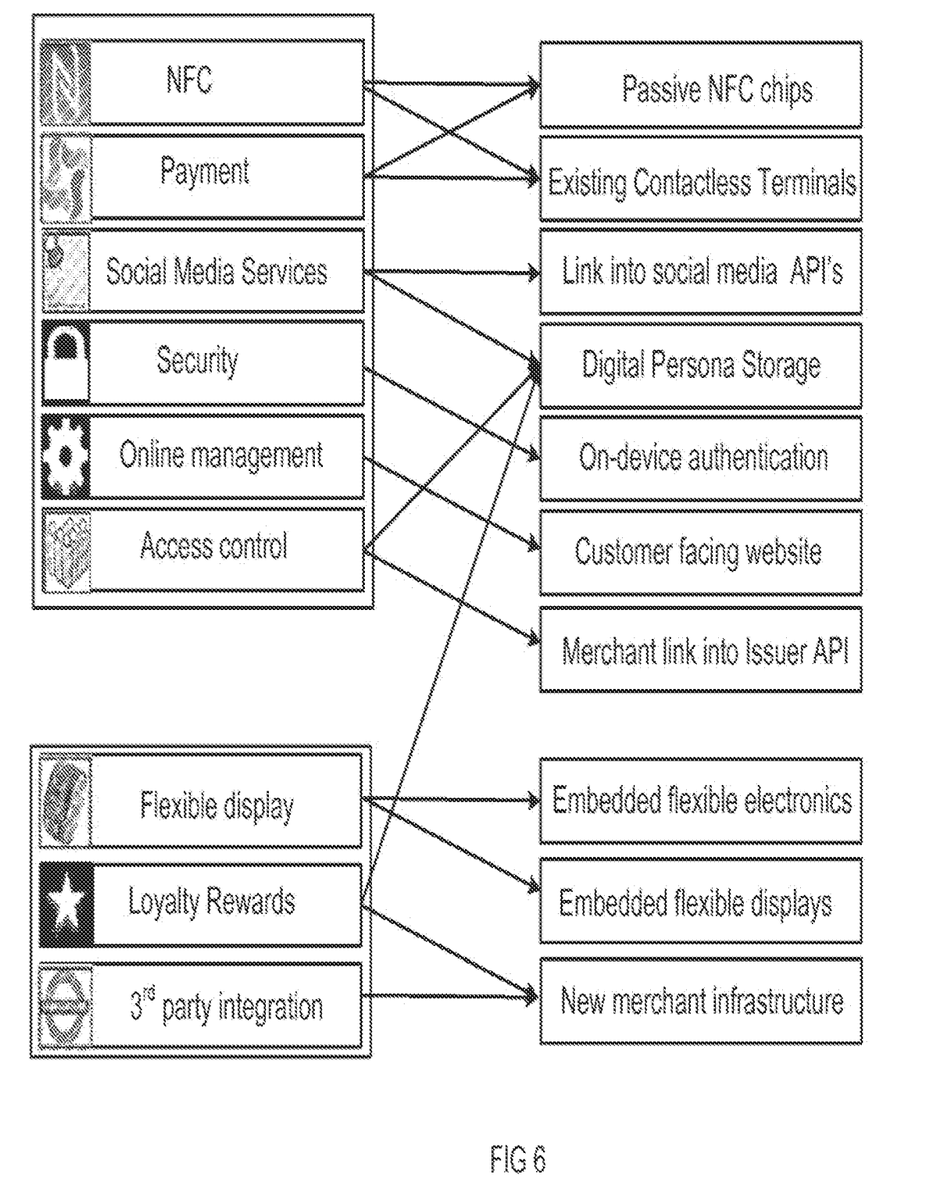
FIG. 6 illustrates an exemplary functionality in accordance with various embodiments of the present disclosure.

In various embodiments, and with reference to FIG. 5, exemplary user interaction with an issuer system is depicted. In this manner, authorized users of RF transaction device 101 may control the preferences and access to RF transaction device 101. For instance, a user may log into an online management tool using a secure logon and password. The transaction account issuer/online management system operator may verify and authenticate the logon information. A particular RF transaction device 101 may be selected by the user to be enabled in response to user selections for limited duration, a reoccurring period, limited geographic use, for limited transaction types, transaction amounts, use at specified merchants, and/or capped at a specified balance. The user may also authorize other users and select previously stored biometric information or configure a particular RF transaction device 101 to store and encrypt newly inputted biometric information. The issuer system may record these preferences. In this way, a nanny may be authorized to make debit purchases using RF transaction device 101 up to $20.00, on Tuesdays, within a given geographic proximity to a community park using the transaction account issued to a parent. Alternatively, resort goers may be issued RF transaction device 101 for securely purchasing items on the property. In another embodiment, a business may issue sales employees RF transaction device 101 capped at a daily per diem amount to negate the need for after-the-fact reimbursement payment processing.

In various embodiments, rather than consummating a transaction, RF transaction device 101 may be used to transfer personal information in lieu of exchanging a business card. For instance, in certain scenarios, such as at a convention, a user may wish to exchange their contact information, but may not be carrying a business card. In other scenarios business cards lack functionality. Using the present system, a user may preset their RF transaction device 101 to an RFID reader at a presenter's booth and after authorization transmit their personal information to a storage device of the booth-holder. In this manner, a business card is not needed.

Furthermore, a transaction device as described herein may be associated with various applications which allow the transaction devices to participate in various programs, such as, for example, loyalty programs. A loyalty program may include one or more loyalty accounts. Exemplary loyalty programs include frequent flyer miles, on-line points earned from viewing or purchasing products or websites on-line and programs associated with diner's cards, credit cards, debit cards, hotel cards, calling cards, and/or the like. Generally, the user is both the owner of the transaction account and the participant in the loyalty program; however, this association is not necessary. For example, a participant in a loyalty program may gift loyalty points to a user who pays for a purchase with his own transaction account, but uses the gifted loyalty points instead of paying the monetary value.

The transaction device may furthermore be associated with coupon information or the like.

A data set may contain any type of information stored in digital format. For example, a data set may include account numbers, programs/applications, scripts, codes, cookies, instruments for accessing other data sets, and/or any other information.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone●, Palm Pilot●, Blackberry●), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/groups/SNS/cloud-computing/cloud-def-v15.doc (last visited Feb. 4, 2011), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

Although all data sets associated with a particular RF transaction device 101 may be owned by the same owner, it is contemplated that in general, some of the data sets stored on the transaction device have different owners. Furthermore, the storage of data sets is configured to facilitate independent storage and management of the data sets on RF transaction device 101. Further still, the data sets may be stored in distinct differing formats provided by the distinct issuer or data set owner (also called "issuer" herein). The owners of data sets may include different individuals, entities, businesses, corporations, software, hardware, and/or the like. However, one skilled in the art will appreciate that the owners may also include different divisions or affiliates of the same corporation or entity.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

The data sets may be annotated. This annotation may be used for types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, and symmetric and asymmetric cryptosystems. The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQTM (formerly MQSeries) by IBM, Inc. (Armonk, NY) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Java Cryptography" by Jonathan Knudson, published by O'Reilly & Associates (1998); (2) "Cryptography & Network Security: Principles & Practice" by William Stallings, published by Prentice Hall; all of which are hereby incorporated by reference.

As used herein, the term "end user", "consumer", "customer", "cardmember", "business" or "merchant" may be used interchangeably with each other, and each shall mean any person, entity, machine, hardware, software or business. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein.

The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express●, VisaNet● and the Veriphone● networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

Referring now to FIGS. 2-6 the process flows and screenshots depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIGS. 2-6, but also to the various system components as described above with reference to FIG. 1.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Phrases and terms similar to an "entity" may include any individual, consumer, customer, group, business, organization, government entity, transaction account issuer or processor (e.g., credit, charge, etc), merchant, consortium of merchants, account holder, charitable organization, software, hardware, and/or any other type of entity. The terms "user," "consumer," "purchaser," and/or the plural form of these terms are used interchangeably throughout herein to refer to those persons or entities that are alleged to be authorized to use a transaction account.

As used herein, an RFID reader may be any reader device configured to communicate using a RFID internal antenna and/or an external RFID antenna, where the external antenna may be made remote to the RFID reader using a suitable cable and/or data link. The RFID reader may be further in communication with a merchant system via one or more data links.

Phrases and terms similar to "account", "account number", "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.2 available at http://www.emvco.com/default.aspx.

The account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

Phrases and terms similar to "transaction account" may include any account that may be used to facilitate a financial transaction. Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution. Phrases and terms similar to "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like. The terms "payment vehicle," "financial transaction instrument," "transaction instrument" and/or the plural form of these terms may be used interchangeably throughout to refer to a financial instrument. Phrases and terms similar to "merchant," "supplier" or "seller" may include any entity that receives payment or other consideration. For example, a supplier may request payment for goods sold to a buyer who holds an account with a transaction account issuer. Phrases and terms similar to a "buyer" may include any entity that receives goods or services in exchange for consideration (e.g. financial payment). For example, a buyer may purchase, lease, rent, barter or otherwise obtain goods from a supplier and pay the supplier using a transaction account. Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Phrases similar to a "payment processor" may include a company (e.g., a third party) appointed (e.g., by a merchant) to handle transactions for merchant banks. Payment processors may be broken down into two types: front-end and back-end. Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction. Phrases similar to a "payment gateway" or "gateway" may include an application service provider service that authorizes payments for e-businesses, online retailers, and/or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

Therefore, the following is claimed:

1. A computer-implemented method comprising:
storing, by a payment device, a biometric identifier of a user in a memory of the payment device, the biometric identifier being associated with a transaction account;
receiving, by an antenna of the payment device, a near field communication (NFC) interrogation signal from a point of sale (POS) device in order to activate the payment device for a payment transaction;
determining, by a biometric sensor of the payment device, a scanned fingerprint identifier of the user in response to the NFC interrogation signal activating the payment device;
authenticating, by the payment device, the scanned fingerprint identifier by matching the fingerprint identifier to the biometric identifier; and
transmitting, by the antenna of the payment device, the transaction account to the POS device for processing the payment transaction based at least in part on the authentication of the scanned fingerprint identifier.

2. The computer-implemented method of claim 1, wherein the biometric sensor is integral to a flexible substrate of the payment device.

3. The computer-implemented method of claim 1, wherein the NFC interrogation signal provides power to the payment device in order to activate the payment device for processing the transaction.

4. The computer-implemented method of claim 1, wherein the payment device comprises a flexible substrate that includes a computing device coupled to the antenna.

5. The computer-implemented method of claim 1, wherein the biometric identifier is a first biometric identifier, and a second biometric identifier is stored in the memory, wherein the scanned fingerprint identifier is authenticated based at least in part on matching the scanned fingerprint identifier to the first biometric identifier or the second biometric identifier.

6. The computer-implemented method of claim 1, further comprising:
activating, by the payment device, a light on the payment device based at least in part on matching the scanned fingerprint identifier to the biometric identifier.

7. The computer-implemented method of claim 1, wherein the biometric identifier is stored as an encrypted numerical representation for a fingerprint of the user.

8. A payment device, comprising:
a substrate that includes an antenna, a fingerprint sensor, a processor, and a memory, the memory comprising a biometric identifier associated with a transaction account;
the memory having instructions, when executed, cause the processor to at least:
receive, by the antenna, a near field communication (NFC) interrogation signal from a point of sale (POS) device in order to activate the payment device for a payment transaction;
determine, by the fingerprint sensor, a scanned fingerprint identifier of a user in response to the NFC interrogation signal activating the payment device;
authenticate the scanned fingerprint identifier by matching the scanned fingerprint identifier to the biometric identifier; and
transmit, by the antenna, the transaction account to the POS device for processing the payment transaction based at least in part on the authentication of the scanned fingerprint identifier.

9. The payment device of claim 8, wherein the substrate is a flexible substrate and the fingerprint sensor is integral to the flexible substrate.

10. The payment device of claim 8, wherein the NFC interrogation signal provides power to the payment device in order to activate the payment device for processing the transaction.

11. The payment device of claim 8, wherein the biometric identifier is a first biometric identifier, and a second biometric identifier is stored in the memory, wherein the scanned fingerprint identifier is authenticated based at least in part on matching the scanned fingerprint identifier to the first biometric identifier or the second biometric identifier.

12. The payment device of claim 8, wherein the instructions, when executed, cause the processor to at least:
activate a light on the payment device based at least in part on matching the scanned fingerprint identifier to the biometric identifier.

13. The payment device of claim 8, wherein the biometric identifier is stored as an encrypted numerical representation for a fingerprint of the user.

14. The payment device of claim 8, wherein identifying the scanned fingerprint identifier of the user further causes the processor to at least:
encrypt the scanned fingerprint identifier to generate an encrypted scanned fingerprint identifier.

15. The payment device of claim 14, wherein authenticating the scanned fingerprint identifier comprises matching the encrypted scanned fingerprint identifier to the biometric identifier.

16. A biometric payment device, comprising:
a flexible substrate that includes antenna, a fingerprint sensor, a processor, and a memory, the memory comprising a fingerprint identifier associated with a transaction account; and
the memory having instructions, when executed, cause the processor to at least:
receive, by the antenna, a radio frequency (RF) interrogation signal from a point of sale (POS) device in order to activate the biometric payment device for a payment transaction;
identify, by the fingerprint sensor, a scanned fingerprint identifier of a user in response to the RF interrogation signal activating the biometric payment device;
authenticate the scanned fingerprint identifier by matching the scanned fingerprint identifier to the fingerprint identifier; and
transmit, by the antenna, the transaction account to the POS device for processing the payment transaction based at least in part on the authentication of the scanned fingerprint identifier.

17. The biometric payment device of claim 16, wherein the fingerprint sensor is integral to the flexible substrate.

18. The biometric payment device of claim 16, wherein the RF interrogation signal provides power to the biometric payment device in order to activate the biometric payment device for processing the transaction.

19. The biometric payment device of claim 16, wherein the instructions, when executed, further cause the processor to at least:
activate a light on the payment device based at least in part on matching the scanned fingerprint identifier to the fingerprint identifier.

20. The biometric payment device of claim 16, wherein the fingerprint identifier is stored as an encrypted numerical representation for a fingerprint of the user.

* * * * *